Patented July 2, 1929.

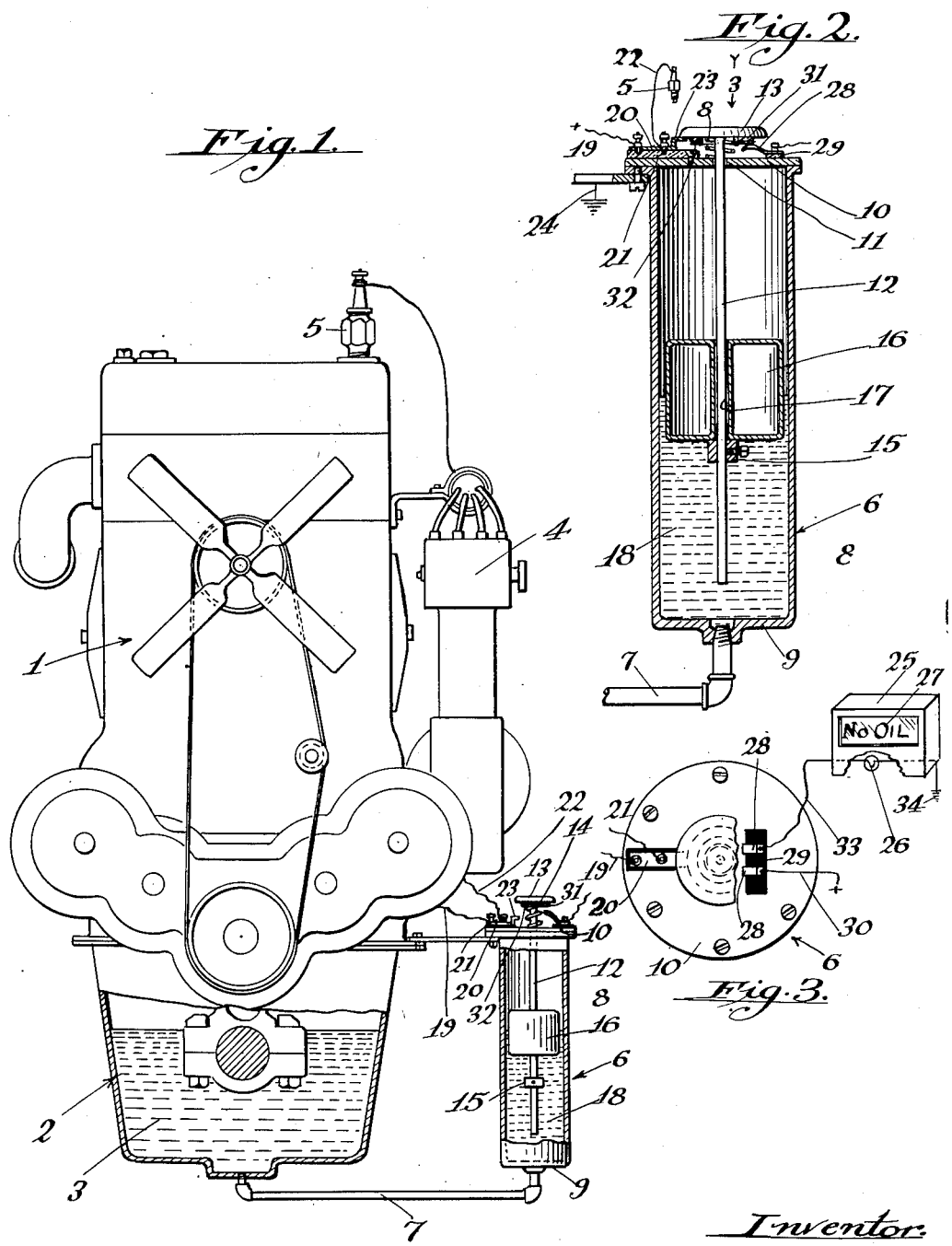

1,719,078

UNITED STATES PATENT OFFICE.

GEORGE J. PAPASHVILI, OF LOS ANGELES, CALIFORNIA.

FLOAT SWITCH.

Application filed May 25, 1926. Serial No. 111,673.

My invention is an oil indicator and ignition control adapted for internal combustion engines and for automobile engines in particular.

An object of my invention is an oil level indicator which, when the lubricating oil for the engine becomes too low, will cut off the ignition and thereby stop the engine.

Another object of my invention is to give a mechanical indication that there is insufficient oil.

In the construction of my invention I utilize an oil container preferably of the cylindrical type, having a float therein, said container being connected to the sump of the crank case of an automobile, having a free flow for the oil to have equal level in both. A float is utilized in the container and operates a rod which is maintained elevated by means of a spring. When the oil is too low the float presses on the rod, thereby compressing the spring. Such action operates an electric make and break device, short-circuiting the ignition of the engine and at the same time making a circuit with a signal light to indicate that the oil is at a low level.

My invention will be more readily understood from the following description and drawings, in which Figure 1 is a front elevation of an engine, showing in section my oil level indicator and ignition control;

Fig. 2 is a vertical section of the indicator, similar to that shown in Fig. 1, on an enlarged scale in the position of low oil level, showing the short-circuiting of the ignition circuit and the making of the signal circuit;

Fig. 3 is a plan view of Fig. 2, in the direction of the arrow, indicating also the visible signal.

In the drawings the engine is designated generally by the numeral 1, having a crank case 2 with oil 3, the engine being provided with the usual distributor 4 and the spark plugs 5. My oil level indicator is designated generally by the numeral 6, the indicator and the crank case being connected by the oil pipe 7.

The indicator comprises a cylindrical container 8 having a closed base 9 and an open top with a cover plate 10 thereon. This cover plate is provided with an aperture 11 through which extends the rod 12, such rod having a head 13 in the form of a disc. A compression spring 14 between the cap and the head normally maintains the rod elevated in the position shown in Fig. 1. The rod is provided with an adjustable collar 15 having a set screw for positioning same in different positions on the rod and a float 16 having a passage 17 therethrough normally floats on the oil 18 in the container and may travel up and down on the rod.

The shoft-circuiting arrangement is substantially as follows:

The ignition circuit is led by a wire 19 through a terminal to a plate 20, this plate having insulation 21 between same and the cap 10. A second wire 22 leads from a suitable binding post in the plate to the distributor and thence from the distributor to the spark plug in the usual manner shown for convenience as direct to the plug in Fig. 2. When the oil is low the float descends on the rod and engages the collar 15, the weight of the float compressing the spring 14 and thus lowering the head 10 until it engages the contact end 23 of the plate 20. Thus the circuit instead of passing through the wire 22 to the distributor passes through the head 13, the spring 14 and other metal parts to the ground 24; thus short-circuiting the distributor and spark plugs and stopping the engine.

As the operator of the engine finding the engine stopped, may not know the exact cause, I give a visible signal notifying him when the oil level is low and before the engine would be shut off. This comprises a signal box 25 having an electric lamp 26 therein and a glass or the like with words such as "No oil" or other indicia as indicated by the numeral 27. A pair of electric contacts 28 are attached to an insulating block 29 which is mounted on the cap 10, one of these contacts being connected to an electric lead 30 which is in circuit with a source of power such as a battery.

An insulating ring 31 is attached to the lower edge of the head 13 and has a metal conducting strip 32 thereon, positioned to engage the contacts 28. A lead 33 extends from one of the contacts opposite to that having the lead 30 and connects to the lamp 26, this lamp being grounded as indicated at 34. The insulating ring is positioned on the head so that the contact end 23 may engage therewith as indicated in Fig. 2.

The contacts 28 in their normal position as shown in Fig. 1, have their ends at a higher elevation than the contact end 23 so that in the descent of the rod 12 and the head 13 the electric circuit through the signal lamp is established before the ignition circuit is short-circuited; thus apprising the operator that the oil is at a low level and before the ignition circuit is cut out.

It is obvious that my invention both as to the electrical short-circuiting arrangement and the visible signal may be considerably changed to suit different types of installations and for different types of engines. Such changes however, would be within the spirit of my invention as set forth in the description, drawings and claim.

Having described my invention, what I claim is:

An oil level indicator and ignition control comprising in combination a substantially cylindrical oil container having an oil connection adjacent the base, a cover plate for the container with an opening therethrough, a rod slidably mounted in said opening and having a head in the form of a disc, an insulating ring and a conducting ring secured to the under side of the head, a conducting plate mounted on an insulating base on the cover, a pair of bridging contacts mounted on an insulation on the cover, such contacts being positioned to engage the conducting ring on the downward movement of the head, a spring surrounding the rod and pressing upwardly against the head from the cover, a float in the container slidable on the rod, an adjustable collar on the rod to engage the float on a condition of low oil level, the bridging contacts being adapted to engage the conducting ring prior to the engagement of the conducting plate with the body of the head, the conducting plate being adapted to form a circuit through the head, the spring, the cover of the container to ground.

In testimony whereof I have signed my name to this specification.

GEORGE J. PAPASHVILI.